US012162135B2

(12) United States Patent
Vadayadiyil Raveendran et al.

(10) Patent No.: US 12,162,135 B2
(45) Date of Patent: Dec. 10, 2024

(54) MANAGING SHARED ROBOTS IN A DATA CENTER

(71) Applicant: Kyndryl, Inc., New York, NY (US)

(72) Inventors: Pramod Vadayadiyil Raveendran, Bengaluru (IN); Kuntal Dey, New Delhi (IN); Sougata Mukherjea, New Delhi (IN); Sarbajit K. Rakshit, Kolkata (IN); Arun Kandoth, Bangalore (IN)

(73) Assignee: Kyndryl, Inc., New York, NY (US)

( * ) Notice: Subject to any disclaimer, the term of this patent is extended or adjusted under 35 U.S.C. 154(b) by 259 days.

(21) Appl. No.: 16/921,222

(22) Filed: Jul. 6, 2020

(65) Prior Publication Data

US 2022/0001549 A1 Jan. 6, 2022

(51) Int. Cl.
*B25J 13/00* (2006.01)
*B25J 9/16* (2006.01)
(Continued)

(52) U.S. Cl.
CPC ............ *B25J 13/006* (2013.01); *B25J 9/161* (2013.01); *B25J 9/1653* (2013.01); *B25J 9/1664* (2013.01);
(Continued)

(58) Field of Classification Search
None
See application file for complete search history.

(56) References Cited

U.S. PATENT DOCUMENTS

2002/0165643 A1* 11/2002 Bancroft ............ G06Q 10/087
700/247
2014/0365258 A1* 12/2014 Vestal ................. G05D 1/0297
901/1
(Continued)

FOREIGN PATENT DOCUMENTS

DE 112017003713 T5 4/2019
WO 2019173396 A1 9/2019

OTHER PUBLICATIONS

IP.com, Augmented Reality Controlled Digital Twin Robot in Data Centers, Jul. 4, 2019, IP.com No. IPCOM000259024D.
(Continued)

*Primary Examiner* — Eric W Stamber
*Assistant Examiner* — Ashley Y Young
(74) *Attorney, Agent, or Firm* — Dan Housley; Rupam Bhar; Calderon Safran & Wright P.C.

(57) ABSTRACT

An embodiment includes identifying a robot that is available to perform a task involving an asset in a data center. The embodiment transmits a script to the robot that includes commands corresponding to actions to be executed by the robot in performing the task and transmits a dispatch command to the robot configured to enable the robot to travel from a robot resting place to the asset to begin the task. The embodiment relays a verification request received from the robot after the robot has completed a portion of the task to the vendor. The embodiment also relays, responsive to the verification request, an updated script based on updated instructions from the vendor for dynamically modifying the task to correcting an irregularity. The embodiment transmits, responsive to completion of the task, a recall command to the robot configured to enable the robot to travel from the asset to the robot resting place.

20 Claims, 8 Drawing Sheets

(51) Int. Cl.
  *G06Q 10/06* (2023.01)
  *G06Q 10/0631* (2023.01)
(52) U.S. Cl.
  CPC ............ *B25J 9/1679* (2013.01); *G06Q 10/06* (2013.01); *G06Q 10/0631* (2013.01)

(56) References Cited

U.S. PATENT DOCUMENTS

| | | | |
|---|---|---|---|
| 2017/0329307 A1* | 11/2017 | Castillo-Effen | G05B 19/4065 |
| 2018/0158016 A1* | 6/2018 | Pandya | G05B 19/41895 |
| 2018/0364052 A1* | 12/2018 | Hackert | G05D 1/024 |
| 2019/0062055 A1* | 2/2019 | Hance | G05D 1/021 |
| 2021/0046655 A1* | 2/2021 | Deyle | B25J 9/1664 |

OTHER PUBLICATIONS

Vivek, How a Robot Can Simplify Data Center Management, Data Center Knowledge, Aug. 26, 2013, https://www.datacenterknowledge.com/archives/2013/08/26/how-a-robot-can-simplify-data-center-management.

Carroll, Data Center Futuristics: Make Way for the Robots!, Lifeline Data Centers, 2020, https://lifelinedatacenters.com/data-center/data-center-futuristics-make-way-robots/.

Kleyman, The Role of Robotics in Data Center Automation, Data Center Knowledge, Dec. 18, 2013, https://www.datacenterknowledge.com/archives/2013/12/18/role-robotics-data-center-automation.

\* cited by examiner

MANAGING SHARED ROBOTS IN A DATA CENTER

BACKGROUND

The present invention relates generally to a method, system, and computer program product for data center management. More particularly, the present invention relates to a method, system, and computer program product for managing vendor-shared robots in a data center.

Modern data centers house vast amounts of information technology (IT) equipment. For example, the IT equipment housed by commercial data centers may include hundreds or thousands of data processing systems and related resources, such as servers, client computers, software components, printers, routers, and other forms of hardware and software. Many data centers provide data processing systems for businesses and other organizations that utilize the data processing systems from remote locations for various computer operations. There is often a demand for continuous access to the data processing systems, which creates incentive for the data center to offer high-availability data processing systems that experience as little downtime as possible. As a result, data center personnel and third-party vendors spend considerable amounts of time installing, managing, and maintaining data center equipment in order to minimize system downtime.

SUMMARY

The illustrative embodiments provide for managing shared robots in a data center. An embodiment includes identifying a robot that is available to perform a task involving an asset in a data center. The embodiment also includes transmitting a script based on instructions received from a vendor associated with the task to the robot, wherein the script includes commands corresponding to actions to be executed by the robot in performing the task. The embodiment also includes transmitting a dispatch command to the robot configured to enable the robot to travel from a robot resting place to the asset to begin the task. The embodiment also includes relaying a verification request received from the robot after the robot has completed a portion of the task to the vendor. The embodiment also includes relaying, responsive to the verification request, an updated script based on updated instructions from the vendor for dynamically modifying the task to correct an irregularity. The embodiment also includes transmitting, responsive to an indication from the robot of completion of the task, a recall command to the robot configured to enable the robot to travel from the asset to the robot resting place. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
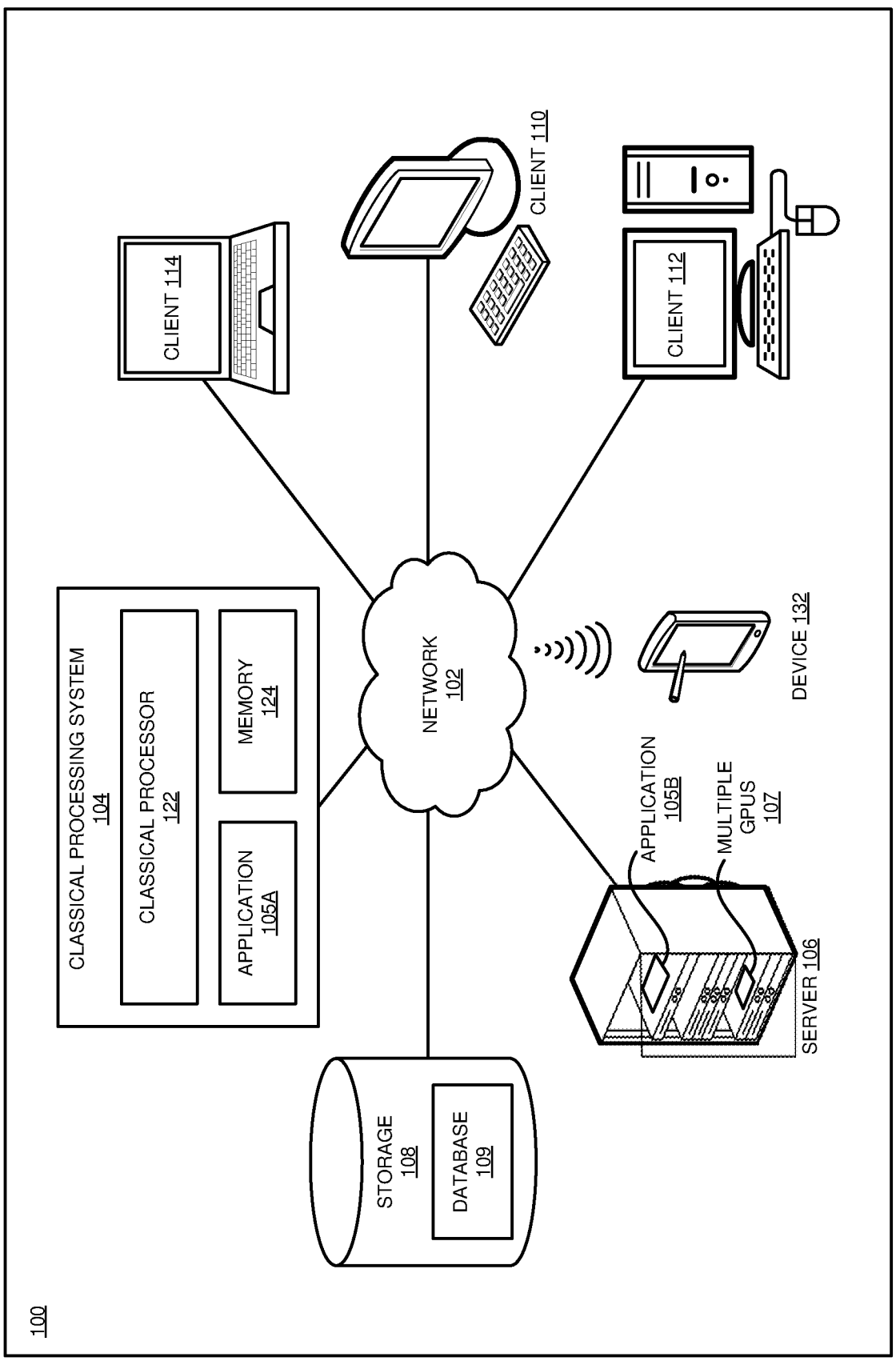
FIG. 1 depicts a block diagram of a network of data processing systems in which illustrative embodiments may be implemented.

Data centers have various assets installed, managed, maintained and supported by data center personnel and various other entities, including outside engineers, third-party vendors, and other individuals that may be responsible for performing or overseeing tasks in the data center, such various other entities being collectively referred to herein as "vendors" for the sake of clarity. There are many repetitive tasks in data centers that are performed by such vendors. For example, such tasks may include part replacement in servers, data storage devices, and networking devices, or may include checking hardware status lights when the hardware is not remotely reachable, e.g., cannot be reached via a network.

Data centers typically maintain a secure data center environment that involves access policies and procedures that must be followed by those working in and visiting the data center. The data processing systems and other IT equipment are usually housed in non-public spaces and only individuals who are expressly authorized to do so may enter these areas. General access is usually given to certain individuals whose job responsibilities require that they have access to such areas. Third-party vendors are given escorted access, which means that certain data center employees must escort and closely monitor vendors for the duration of their visit. Thus, an on-site visit by a vendor engineer consumes manhours for both the vendor and the data center personnel.

The illustrative embodiments used to describe the invention recognize that many tasks performed by data center personnel and/or third-party vendor engineers are repetitive tasks that can be performed completely or in part by robotic maintenance and/or monitoring devices, referred to herein as robots. As used herein, the term robot can include a machine, device, apparatus or the like, especially one that is multi functional, re-programmable, automatic industrial machine.

For example, robots discussed herein include machines that are programmable by a computer, capable of carrying out a series of actions automatically and autonomously, semi-autonomously, or assisted, for example under the control of a local or remote user. Also, example embodiments of robots discussed herein include those that have one or more of a power unit, controller, actuator, user interface, and various sensors, such as one or more of a camera/light sensor, proximity sensor, sound sensor, temperature sensor, and acceleration sensor, among others.

The illustrative embodiments also recognize that general-purpose robots can be deployed that can perform a range of tasks. For example, in some embodiments, a same robot is used for asset scanning within the data center and for impact assessment during a disaster scenario. Also, in some embodiments, a same robot is used by data center personnel and by a plurality of different vendors to perform tasks for multiple entities.

Hence, disclosed embodiments include a system and associated methods that include the use (and reuse) of a standard set of robots in a data center by one or more vendors. For example, some embodiments include program instructions that guide the robot through performance of a task, program instructions that support artificial intelligence, or program instructions that support human guidance. In some embodiments, human guidance includes an on-site vendor at the data center using a controller to guide the actions of a robot, and/or includes an off-site vendor remotely controlling the robot using augmented reality (AR) technology. Embodiments of robots may be implemented in any of a wide variety of forms, for example as a mobile manipulator, a humanoid, or a drone. Embodiments of robots include machines designed to perform a task with no regard to their aesthetics. In some embodiments, a robot is a "soft robot," which is a type of robot that contains no (or few) rigid internal structural elements and is loosely modeled on animals with non-rigid body parts.

In some embodiments, robots execute repetitive and/or standard sets of tasks within the data center. In some embodiments, robots perform tasks that have been previously agreed upon between vendors and data center management. Non-limiting examples of tasks performed by robots may include sensing atmospheric conditions in the vicinity of IT equipment, sensing visual and/or audible signals emitted from IT equipment, detecting an operational status of IT equipment, performing diagnostic or maintenance tasks on IT equipment, and/or installing, replacing, and/or removing IT equipment.

In some embodiments, a data center includes a Robot Resting Place (RRP) that includes space for one or more robots while idle. In some embodiments, an RRP includes implements for recharging battery-powered robots. In some embodiments, an RRP detects and/or reports a number of idle robots and/or types of idle robots. In some embodiments, an RRP receives and stores parts for use by a robot in performing a task, such as a replacement part for a robot to use for a task that involves replacing IT equipment or as a new part for a robot to use for a task that involves installing new IT equipment.

In some embodiments, a data center includes a Robot Control Platform (RCP). In some embodiments, an RCP is in communication with various service management tools within the data center and/or within a vendor's organization. In some embodiments, an RCP provides alerts and/or updates to remote vendors regarding the vendor's IT equipment and/or tasks submitted from vendors for robots to perform. In some embodiments, an RCP provides alerts in real time, near real time, or using batch processing. In some embodiments, an RCP includes a proxy for relaying communications between vendors and robots. For example, in some embodiments, an RCP relays signals between a robot and a remote vendor that allow the remote vendor to control the robot from a remote location. In some such embodiments, an RCP relays augmented-reality data packets between a robot and a remote vendor that allow the remote vendor to use augmented reality technology to control the robot.

In some embodiments, an RCP limits remote access to a robot based on a task assigned to a robot, and only allows a vendor associated with the assigned task to have remote access to the robot. For example, in some embodiments, the RCP includes a verification process that authenticates a vendor to confirm the vendor's identity and authorization prior to granting the vendor remote access to a robot. For example, in some embodiments, the RCP confirms that the vendor is authorized to use a robot, that the vendor is authorized to perform the task, that the task is an agreed-upon task between the vendor and the data center, and/or that the asset associated with the task is an asset that the vendor has authority to access. In some embodiments, the RCP establishes a window of time that limits an amount of time that a vendor is granted remote access to a robot. For example, in some such embodiments, the RCP establishes a window of time based on information associated with a task to be performed by a robot, alerts a vendor when the window of time is close to expiring, and extends the window upon request from the vendor and/or confirmation from data center personnel that the task is taking longer than expected to complete.

In some embodiments, an RCP monitors robots while robots are performing tasks. For example, in some such embodiments, an RCP monitors robots to confirm that robot activity complies with security and/or compliance policies of the data center. In some embodiments, an RCP monitors robots while performing tasks to confirm that the task is being performed in compliance with a change record associated with the task and/or with data center policies. In some embodiments, an RCP allows the vendor to upload instructions, which the RCP converts to a script containing sets of commands corresponding to actions to be executed by the robot in performing a task. In some such embodiments, an RCP receives validation from a vendor to confirm the correct instructions have been received by the RCP, such as a checksum that the RCP uses to compare with a calculated checksum of the instruction to confirm the authenticity of the instructions. Also, in some such embodiments, data center personnel review, validate, and/or authorize the instructions and resulting script before the robot can perform the actions defined by the script in the data center.

In some embodiments, an RCP communicates with an RRP to determine if a part has been received that is associated with a particular task, and if the RCP determines that the part has not been received, the RCP delays the task until the part has been received. In some such embodiments, the RCP notifies the vendor if the received part is not the correct part. In some embodiments, if the RCP determines that a part has been received, the RCP requests information about the received part from the RRP, such as information received by the RRP or a robot in response to scanning a bar code on the part or a photo taken by the RRP or a robot of the part. In some such embodiments, the RCP uses the information to confirm that the received part is the correct part for the task.

Alternatively, the RCP requests confirmation from the RRP that the RRP or a robot verified that the received part is the correct part for the task.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
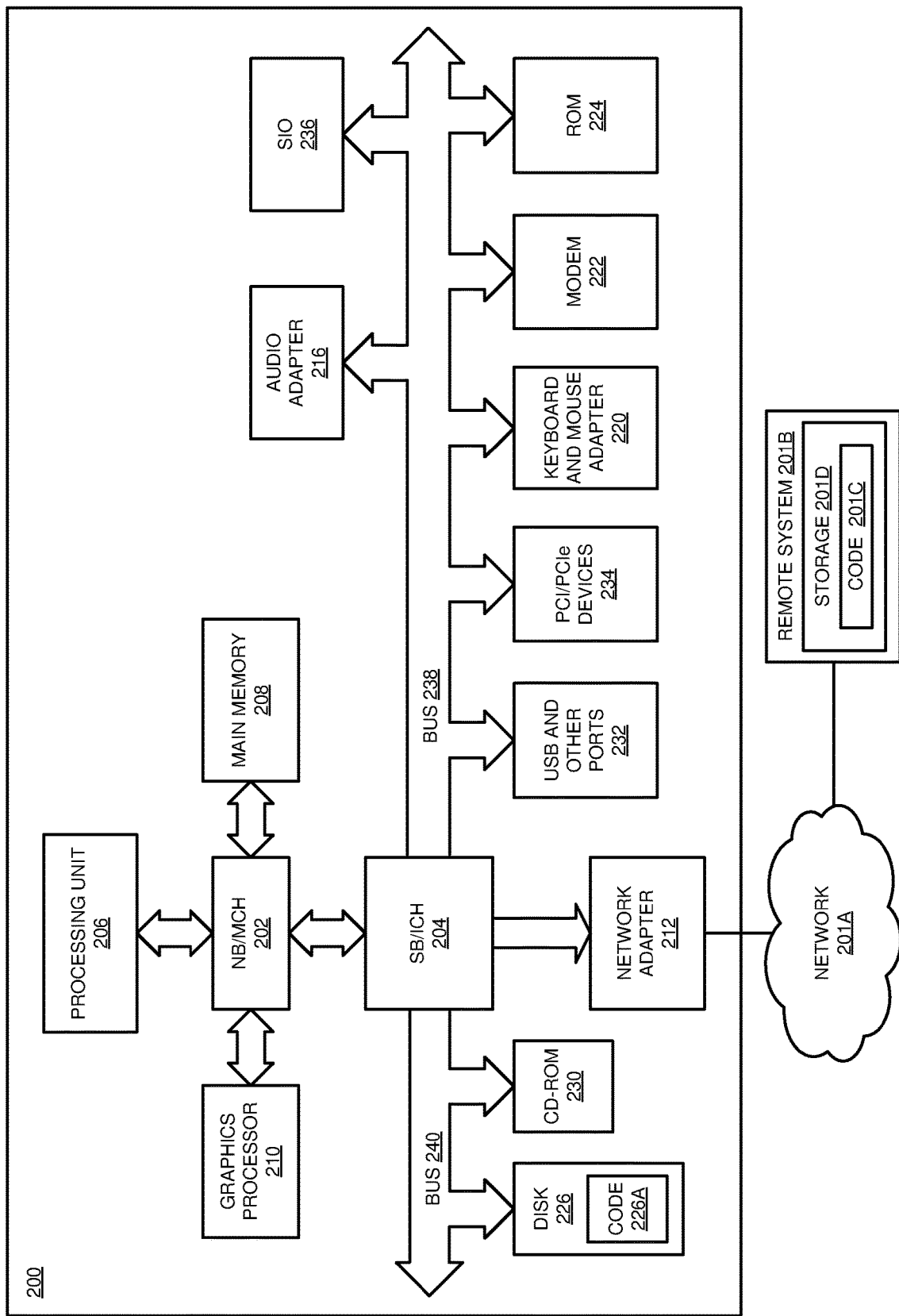
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment of a data center and a robot control platform for a data center.

For example, server 106, and clients 110, 112, 114, are depicted as servers and clients only as example and not to imply a limitation to a client-server architecture. As another example, an embodiment of a robot control platform for a data center can be distributed across several data processing systems, and a data network as shown, whereas another embodiment of a robot control platform for a data center can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by application 105B such as initiating processes described herein of a robot control platform for a data center. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and Peripheral Component Interconnect (PCI)/Peripheral Component Interconnect Express (PCIe) devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
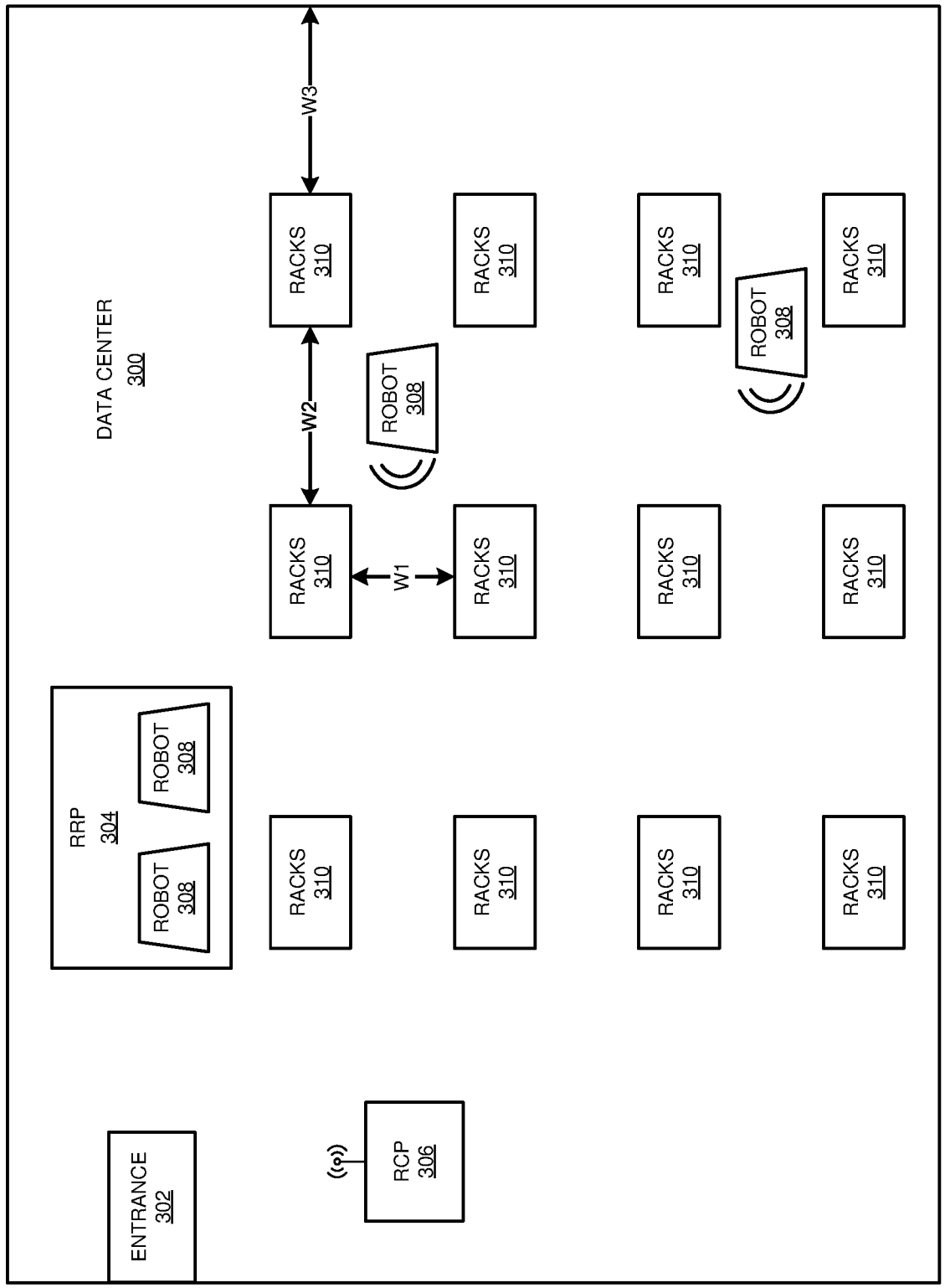
FIG. 3 depicts a block diagram of an example data center in accordance with an illustrative embodiment.

With reference to FIG. 3, this figure depicts a block diagram of an example data center 300 in accordance with an illustrative embodiment. The example embodiment includes an RRP application for controlling an RRP 304, and an RCP application for controlling an RCP 306. In a particular embodiment, RRP and RCP applications 304/306 are examples of applications 105A/105B of FIG. 1.

In some embodiments, the data center 300 includes an entrance 302, an RRP 304, an RCP 306, one or more robots 308, and a plurality of racks 310 of data processing systems. While only twelve racks 310 and four robots 308 are shown for purposes of clarity, many more may be present. In alternative embodiments, the data center 300 can include some or all of the functionality described herein but grouped differently into one or more systems or modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the robots 308 include a standard set of soft robots to execute repetitive mutually agreed-upon tasks within the data center 300 with the support of the RRP 304 and the RCP 306. In some embodiments, the RRP 304 and RCP 306 are integrated with various service management tools within the data center 300 and vendor organization. Also, in some embodiments, the RCP 306 supports the use of augmented reality technology for vendors to remotely guide a robot 308 to perform an assigned task by establishing and maintaining a network connection between the vendor and the robot and relaying augmented-reality data packets between the vendor and the robot. In some embodiments, the RCP 306 grants a vendor exclusive access on a robot 308 through the RCP 306, which controls the authentication and authorization profile of the onboarded vendor. In some embodiments, the RCP 306 does pre- and post-task activities, such as managing the task scheduling of various robots 308 at the RRP 304 and updating task-related records in real-time, near real-time, or in batch processing. In some such embodiments, the RCP 306 uses a robot 308 to assist with pre- and/or post-task activities. For example, in some embodiments, the RCP 306 does inventory management and verification of parts with the help of robots 308 that search for parts, scan parts, and determine the identity and condition of parts that have arrived for a task or that have been removed during performance of a task.

In some embodiments, the RCP 306 includes a standard platform for robots to receive instructions from vendors. For example, in some embodiments, the RCP 306 manages robots 308 at RRP 304 by assigning tasks, scheduling tasks, and rescheduling tasks. In some embodiments, the RCP 306 stores and/or has access to various data center and vendor information, such as task details, assets affected, and locations of assets within the data center 300. In some embodiments, vendors are onboarded to the RCP 306 according to an onboarding process that includes creating a vendor profile. In some such embodiments, the vendor profile includes such information as authentication and authorization information about the vendor, an agreed set of tasks that robots can perform for the vendor, and assets associated with the vendor. In some embodiments, the RCP 306 grants a vendor exclusive access to a robot 308 while the robot is performing a task for the vendor. In some embodiments, the RCP 306 monitors robots 308 while they execute tasks.

In some embodiments, the RCP 306 facilitates robotic management of parts required to perform certain tasks. In some such embodiments, the RCP 306 manages incoming parts to ensure that received parts are correct parts for respective tasks and alerts the vendor if an incorrect or defective part is discovered. In some embodiments, the RCP 306 also updates data center 300 inventory with details of new parts when tasks involve replacing parts in the data center 300.

In some embodiments, the RCP 306 monitors the robots 308, and serves as a proxy for allowing vendors to monitor robots 308, while the robots 308 perform tasks. In some embodiments, the RCP 306 serves as a proxy for allowing a vendor to guide a robot remotely using AR technology if the task allows for it. In some embodiments, the RCP 306 forwards a set of control commands in the form of a script to robots 308 that are uploaded to the RCP 306 from vendors and ensures execution of those steps. In some embodiments, the RCP 306 facilitates communication between a vendor and a robot 308 so that the vendor can observe and approve of each step as they are performed by the robot 308. In some embodiments, a task includes a series of steps, and after each step, the robot 308 issues a status update to for the vendor that the RCP 306 receives and relays to the vendor. In some embodiments, the status update includes a verification request that requests approval from the vendor before proceeding to the next step. In some embodiments, the data center personnel or management are also involved in the verification process and have final authority on all robot activities and data center systems. In some embodiments, the verification request includes information such as images or test results, for the vendor to review to make a determination about whether completed steps of the task have had the expected results or indicate a problem. In some embodiments, the vendor can remotely view the progress, for example using augmented reality or viewing a video stream of the task being performed by the robot. If the results of the steps have thus far been acceptable, the vendor can issue an instruction to the robot indicating an approval of the results and a command to continue with the next step of the task. If the vendor detects a problem, the vendor can issue instructions for the robot indicating non-approval of the results, and responsive to that instruction the RCP 306 issues a command to the robot 308 to abort the task. Alternatively, the vendor can issue instructions for the robot 308 to correct some problem or irregularity, and responsive to that instruction the RCE 306 issues a script based on the vendor instructions that that dynamically modifies the task to make the correction. In some embodiments, the RCP 306 receives the response from the vendor and relays it to the robot 308. In response, the robot 308 determines if the response is an approval, in which case the robot 308 continues with the next step of the task. Otherwise, if the response is not an approval the robot 308 determines whether the response indicates that the task should be halted or if the response includes an updated script with new commands for the task to correct the detected problem or irregularity.

Figure 4:
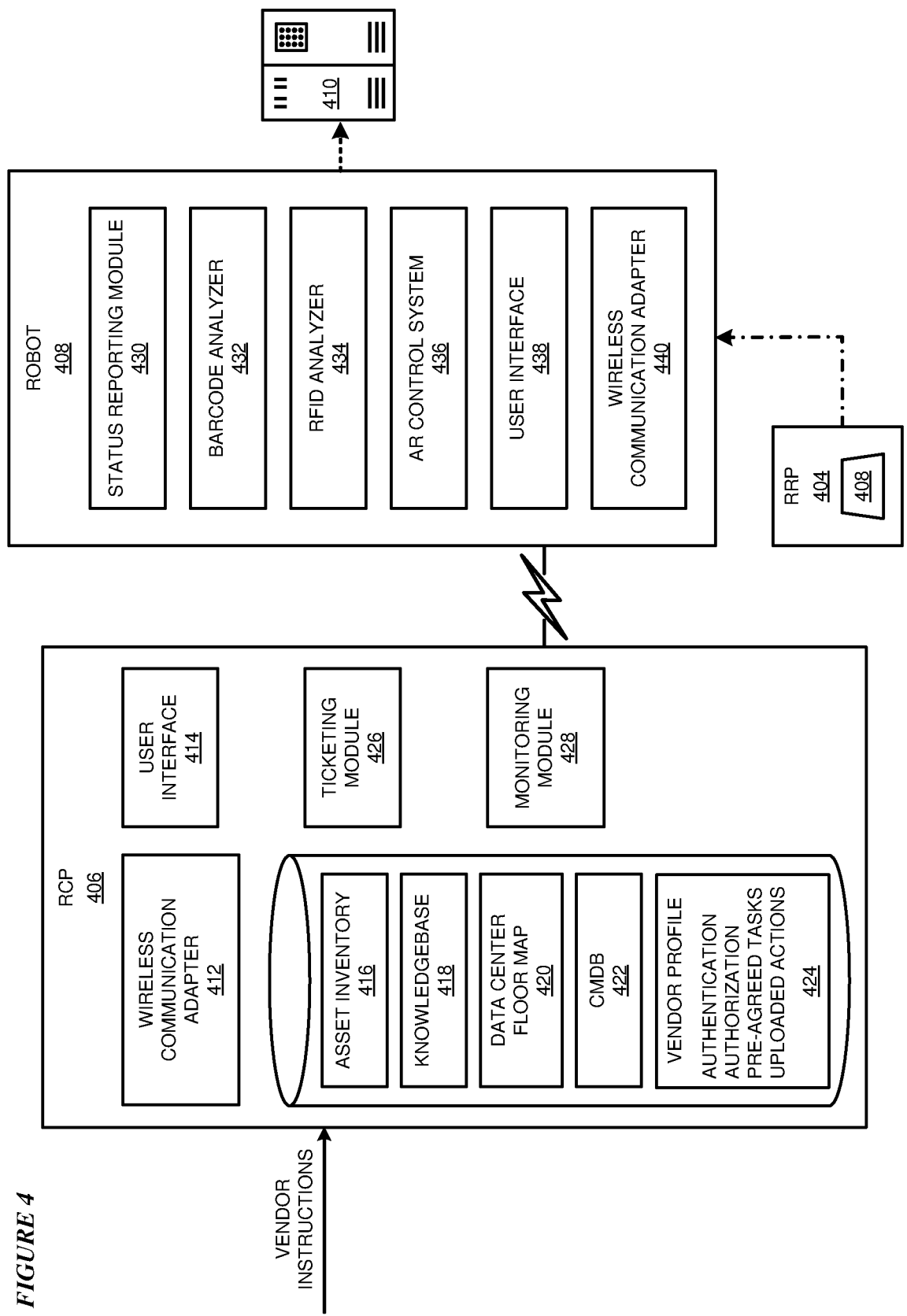
FIG. 4 depicts a block diagram of an example data center showing a more detailed view of an example robot control platform and an example robot in accordance with an illustrative embodiment.

With reference to FIG. 4, this figure depicts a block diagram of an example data center showing a more detailed view of an example RCP 406 and an example robot 408 in accordance with an illustrative embodiment. In a particular embodiment, RCP 406 is an example of RCP 306 of FIG. 3 and operates according to an RCP application, and robot 408 is an example of robots 308 of FIG. 3 and operates according to a robot application, where RCP and robot applications are examples of applications 105A/105B of FIG. 1.

In the illustrated embodiment, the RCP 406 includes a wireless communication adapter 412, a user interface 414, a ticketing module 426, a monitoring module 428, and memory storing asset inventory 416, a knowledgebase 418, a data center floor map 420, a Configuration Management Database (CMDB) 422, and a vendor profile 424 for each registered vendor. In the illustrated embodiment, the robot 408 includes a status reporting module 430, a bar code analyzer 432, a radio frequency identification (RFID) analyzer 434, an AR control system 436, a user interface 438, and a wireless communication adapter 440. In alternative embodiments, the RCP 406 and/or robot 408 can include some or all of the functionality described herein but grouped differently into one or more systems or modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, a data center includes a standard set of robots 408 that are provided for shared use amongst one or more vendors. In some embodiments, the RCP 406 includes program instructions from the vendors that the RCP 406 transmits to a robot 408 that guides the robot 408 through performance of a task. Alternatively, a robot 408 is operates according to program instructions that support artificial intelligence, or program instructions that support human guidance. In some embodiments, human guidance includes an on-site vendor at the data center using a controller to guide the actions of a robot 408, and/or includes an off-site vendor remotely controlling the robot 408 using augmented reality technology via the AR control system 436, which receives and responds to augmented-reality data packets relayed by the RCP 406 to and from the vendor. Embodiments of robots 408 may be implemented in any of a wide variety of forms, for example as a mobile manipulator, a humanoid, or a drone. Embodiments of robots 408 include machines designed to perform a task with no regard to their aesthetics. In some embodiments, a robot 408 is a "soft robot," which is a type of robot 408 that contains no (or few) rigid internal structural elements and is loosely modeled on animals with non-rigid body parts.

In some embodiments, robots 408 execute repetitive and/or standard sets of tasks within the data center. In some embodiments, robots 408 perform tasks that have been previously agreed upon between vendors and data center management. Non-limiting examples of tasks performed by robots 408 may include sensing atmospheric conditions in the vicinity of vendor assets (i.e., IT equipment, data processing systems, computers, servers, routers, etc.) stored in racks 410, sensing visual and/or audible signals emitted from vendor assets stored in racks 410, detecting an operational status of vendor assets stored in racks 410, performing diagnostic or maintenance tasks on vendor assets stored in racks 410, and/or installing, replacing, and/or removing vendor assets stored in racks 410.

In some embodiments, the RCP is integrated with various service management tools such as ticketing module 426 for generating trouble tickets or work orders, knowledgebase(s) 418 that includes a technical library of information for the various IT systems in the data center, an asset inventory 416 that keeps track of installed systems, their status, vendors, and other desired information, a CMDB (Configuration Management Database(s)) 422 is a database that contains all relevant information about the hardware and software components used in the data center IT equipment and services, the relationships between those components. In some embodiments, the RCP 406 includes vendor profiles 424 stored in memory. In some embodiments, the RCP 406 includes a digital copy of the data center floor map 420 to allow the RCP 406 to locate assets and guide robots 408 from the RRP 404 to an asset such as rack 410, for a task. In some embodiments, the RCP 406 communicates wirelessly with robots 408 using the wireless communication adapter 412 that communicates with the wireless communication adapter 440 of the robot 408, for example via Wi-Fi or any other desired wireless form of communication.

In some embodiments, an RCP 406 provides alerts and/or updates to remote vendors regarding the vendor's IT equipment and/or tasks submitted from vendors for robots 408 to perform. In some embodiments, an RCP 406 provides alerts in real time, near real time, or using batch processing. In some embodiments, an RCP 406 includes a proxy for relaying communications between vendors and robots 408. For example, in some embodiments, an RCP 406 relays signals between a robot 408 and a remote vendor that allow the remote vendor to control the robot 408 from a remote location. In some such embodiments, an RCP 406 uses the AR control system 436 to relay augmented-reality signals between a robot 408 and a remote vendor that allow the remote vendor to use augmented reality technology to control the robot 408.

In some embodiments, an RCP 406 limits remote access to a robot 408 based on a task assigned to a robot 408, and only allows a vendor associated with the assigned task to have remote access to the robot 408. For example, in some embodiments, the RCP 406 includes a verification process that authenticates a vendor to confirm the vendor's identity and authorization prior to granting the vendor remote access to a robot 408. For example, in some embodiments, the RCP 406 confirms that the vendor is authorized to use a robot 408, that the vendor is authorized to perform the task, that the task is included in the list of previously agreed-upon tasks in the vendor profile that lists tasks that the vendor can use the robots to perform as previously agreed upon between the vendor and the data center, and/or that the asset associated with the task is an asset that the vendor has authority to access. In some embodiments, the RCP 406 establishes a window of time that limits an amount of time that a vendor is granted remote access to a robot 408. For example, in some such embodiments, the RCP 406 establishes a window of time based on information associated with a task to be performed by a robot 408, alerts a vendor when the window of time is close to expiring, and extends the window upon request from the vendor and/or confirmation from data center personnel that the task is taking longer than expected to complete.

In some embodiments, an RCP 406 monitors robots 408 while robots 408 are performing tasks. For example, in some such embodiments, an RCP 406 monitors robots 408 to confirm that robot 408 activity complies with security and/or compliance policies of the data center. In some embodiments, an RCP 406 monitors robots 408 while performing tasks to confirm that the task is being performed in compliance with a change record associated with the task and/or with data center policies. In some embodiments, an RCP 406 allows the vendor to upload instructions corresponding to actions to be executed by the robot 408 in performing a task. In some such embodiments, an RCP 406 receives validation from a vendor to confirm the correct instructions have been received by the RCP 406, such as a checksum that the RCP 406 uses to compare with a calculated checksum of the instruction to confirm the authenticity of the instructions. Also, in some such embodiments, data center personnel review, validate, and/or authorize the instructions and resulting script before the robot can perform the actions defined by the script in the data center.

Figure 5:
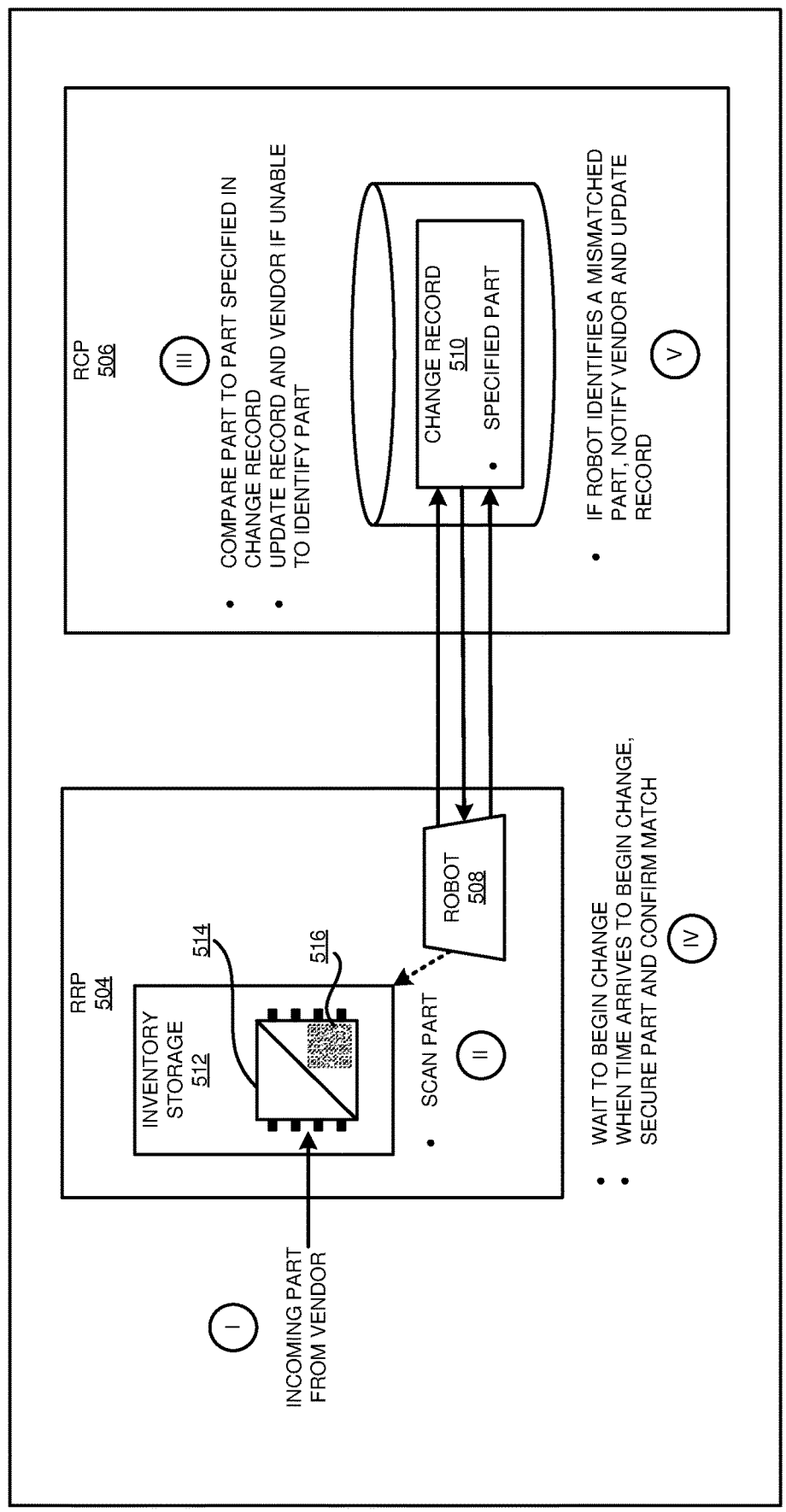
FIG. 5 depicts a block diagram of an example data center showing a more detailed view of an example robot resting place and an example robot control platform in accordance with an illustrative embodiment.

With reference to FIG. 5, this figure depicts a block diagram of an example data center showing a more detailed view of an example RRP 504 and an example RCP 506 in accordance with an illustrative embodiment. In a particular embodiment, RRP 504 is an example of RRP 304 of FIG. 3 and operates according to an RRP application, and RCP 506 is an example of RCP 306 of FIG. 3 and operates according to an RCP application, where RRP and RCP applications are examples of applications 105A/105B of FIG. 1.

In the illustrated embodiment, the RRP 504 includes inventory storage 512 for storing one or more parts 514 that are marked, tagged, or packaged with an identifier, such as a Quick Response (QR) code 516 or other bar code, RFID tag, or other identifying feature that can be discerned by a robot 508. The RCP 506 includes a change record 510 that includes a specified part that the RCP 506 can compare to the part 514 in order to determine if the part 514 is the correct part for a task associated with the change record 510.

In some embodiments, a portion of the RRP 504 is used as to keep the inventory (e.g. spare parts) of various assets related to hardware supplied by various vendors according to a process shown as process portions I through V. Beginning at I, in some such embodiments, parts sent by vendors through courier services arrive and are stored at the RRP 504. Next, at II, after a replacement part has arrived, the robot 508 reads the QR code 516 or other such tag on the parcel. Then, at III, the process includes analyzing the part with the help of RCP 506, which attempts to compare the part to parts specified in the change record and the item expected as per the instructions uploaded by the vendor to the RCP 506 until a date and time when the vendor can install the part. In some embodiments, if the RCP 506 and robot 508 are unable to identify a part or confirm a task associated with the part, it updates RCP 506 and in turn the vendor and change record. As indicated at IV, if the part matches a change record 510, the robot 508 and RCP 506 update the change record 510 to indicate the part has arrived, so the task may be ready to be performed if no other parts are needed, or that there are still more parts needed. If the task is ready to be performed, the RCP 506 will coordinate with the availability of the vendor if necessary to schedule a time for the task to be performed and assign a robot 508 to perform the task.

As indicated at V, if a robot 508 identifies a mismatched part, such as a wrong or missing part that was received, the RCP 506 informs the vendor and updates the change record 510 to indicate that the wrong part was received. Vendor can validate this upon receiving the information from RCP 506 and take action by confirming the part or by sending the correct part.

Figure 6:
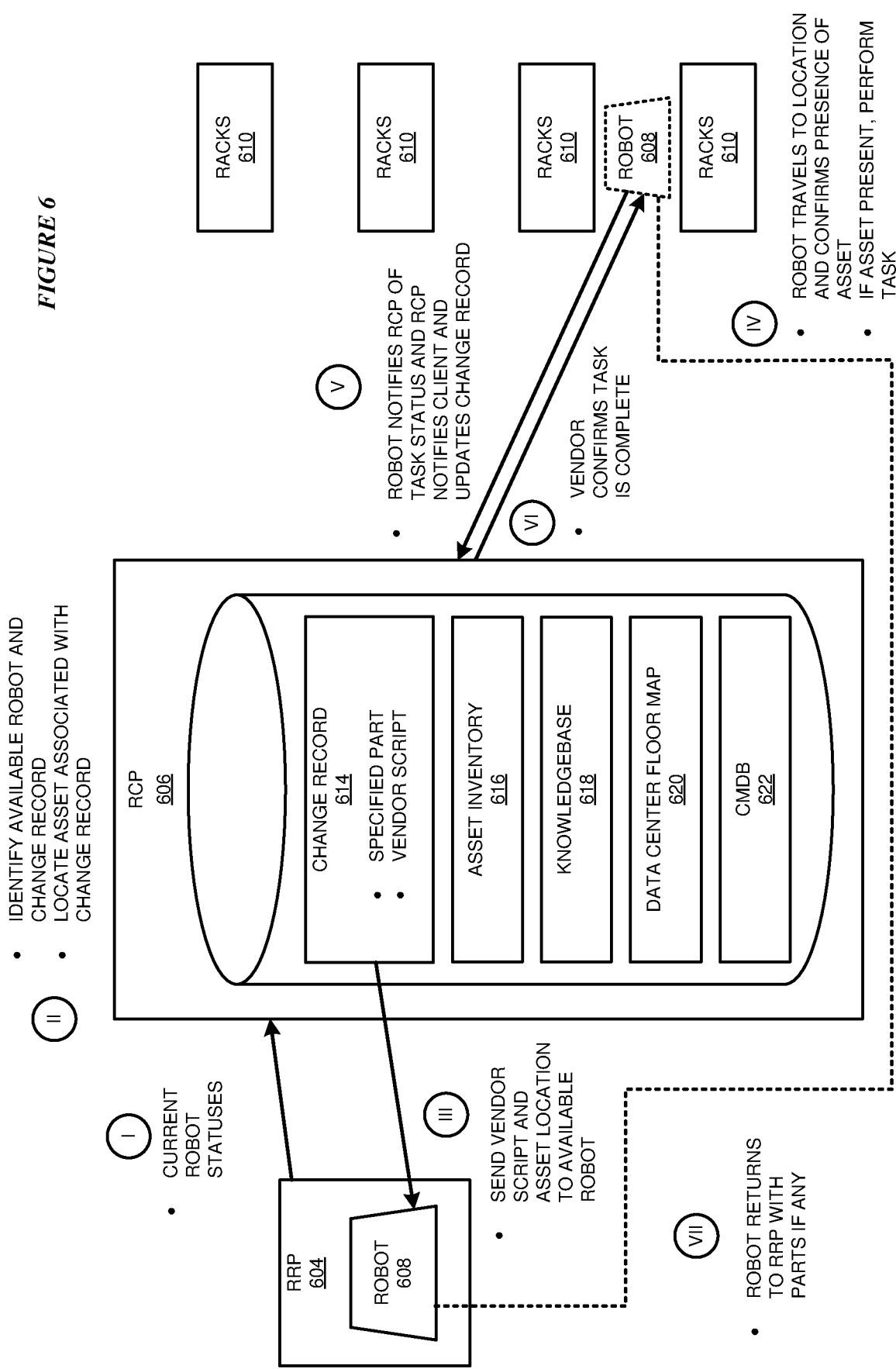
FIG. 6 depicts a block diagram of an example data center showing a more detailed view of an example task process in accordance with an illustrative embodiment.

With reference to FIG. 6, this figure depicts a block diagram of an example data center showing a more detailed view of an example task process in accordance with an illustrative embodiment. In a particular embodiment, the example task process includes an RCP application process performed by RCP 606, which is an example of RCP 306 of FIG. 3, and the RCP application is an example of applications 105A/105B of FIG. 1.

In the illustrated embodiment, the data center includes an RRP 604, one or more robots 608, an RCP 606, and a plurality of racks 610. In some embodiments, RCP 606 includes memory storing a change record 614, an asset inventory 616, a knowledgebase 618, a data center floor map 620, and a CMDB 622. In alternative embodiments, the data center and/or RCP 606 can include some or all of the functionality described herein but grouped differently into one or more systems or modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, an example task process shown as process portions I through VII in FIG. 6 generally indicates how some embodiments of an RCP 606 controls a robot 608 to perform a task. In some embodiments, a vendor already onboarded to the RCP 606 gets exclusive access to the robot 608 assigned to perform a task during the window of time allocated by RCP 606 for the task, i.e., the change window. In order to assign a robot 608 to a vendor for a task, as indicated at I, the RCP 606 first gets a status update from RRP 604 indicating the number of robots 608 available in RRP 604 that are ready to begin a task. Next, as indicated at II, the RCP 606 identifies and reserves an available robot 608 and scans the change record 614 and identify the asset location (e.g., rack 610) with the help of digital floor map 620, CMDB 622, and/or the asset inventory 616.

Next, as indicated at III, the RCP 606 transmits a dispatch command and/or the script based on the vendor's instructions to the reserved robot 608 and the asset location so that the script and/or vendor takes control of the robot 608 at the RRP 604. Next, as indicated at IV, the robot 608 is guided from the RRP 604 to the asset associated with the task, such as a rack 610, bringing any part(s) for the task, and confirms the presence of the asset to be maintained. In the case of a missing asset, the task is cancelled, the robot 608 returns to the RRP 604, and the vendor is notified. Otherwise, as indicated at V, the robot 608 begins the task and continues to perform the task while sending updates to the RCP 606 regarding the status of the task. For example, in some embodiments, the robot 608 initially checks a status of asset to be replaced and ensures that it is in power-off state (if the particular task requires a power-off state) and sends an update to RCP 608 when the appropriate status is achieved. The robot 608 continues performing the task as per the script and/or under the remote control of a vendor, for example where the vendor operates the robot 608 from a remote location using AR technology. In some embodiments, as each step is done, the robot 608 updates the results to RCP 606 and, if the update includes a verification request, the robot awaits approval from the vendor to proceed to the next step. In some embodiments, as the RCP 606 receives updates and/or verification requests from the robot, the RCP 606 updates the change record 614 and/or the vendor. In some embodiments, a vendor confirms one or more steps have been performed correctly in response to verification request(s) and issues a signal through the RCP 606 to the robot 608 that is interpreted by the robot 608 as permission to execute a next step. In some embodiments, if a vendor is not satisfied with the results of a step, the vendor can issue instructions to the robot 608 through the RCP 606 to halt the task. In some embodiments, if a vendor is not satisfied with the results of a step, the vendor can dynamically modify the task by issuing updated instructions that are converted to a script by the RCP 606 and relayed to the robot 608. The updated script includes commands for the robot to correct any irregularities noticed by the vendor in response to the verification request.

As indicated at VI, once the robot 608 issues an update that a last step is complete, the vendor confirms that the task is complete. As indicated at VII, in some embodiments, once the task is complete and the vendor has confirmed that the task is complete, the RCP issues a recall command to the robot 608, which the robot 608 interprets as instructions to go back to the RRP 604 and bring any parts or debris that were removed or result from performing the task.

In some embodiments, a same robot 608 is used by multiple vendors to perform different tasks. In some embodiments, a same robot 608 is used to perform pre-change and post-change activities, non-limiting examples of which include checking a status of an asset, performing a visual inspection of an asset, verifying a model name and serial number of a server, status of various LED indicators on a data processing system, and/or other signals from an asset.

Figure 7A:
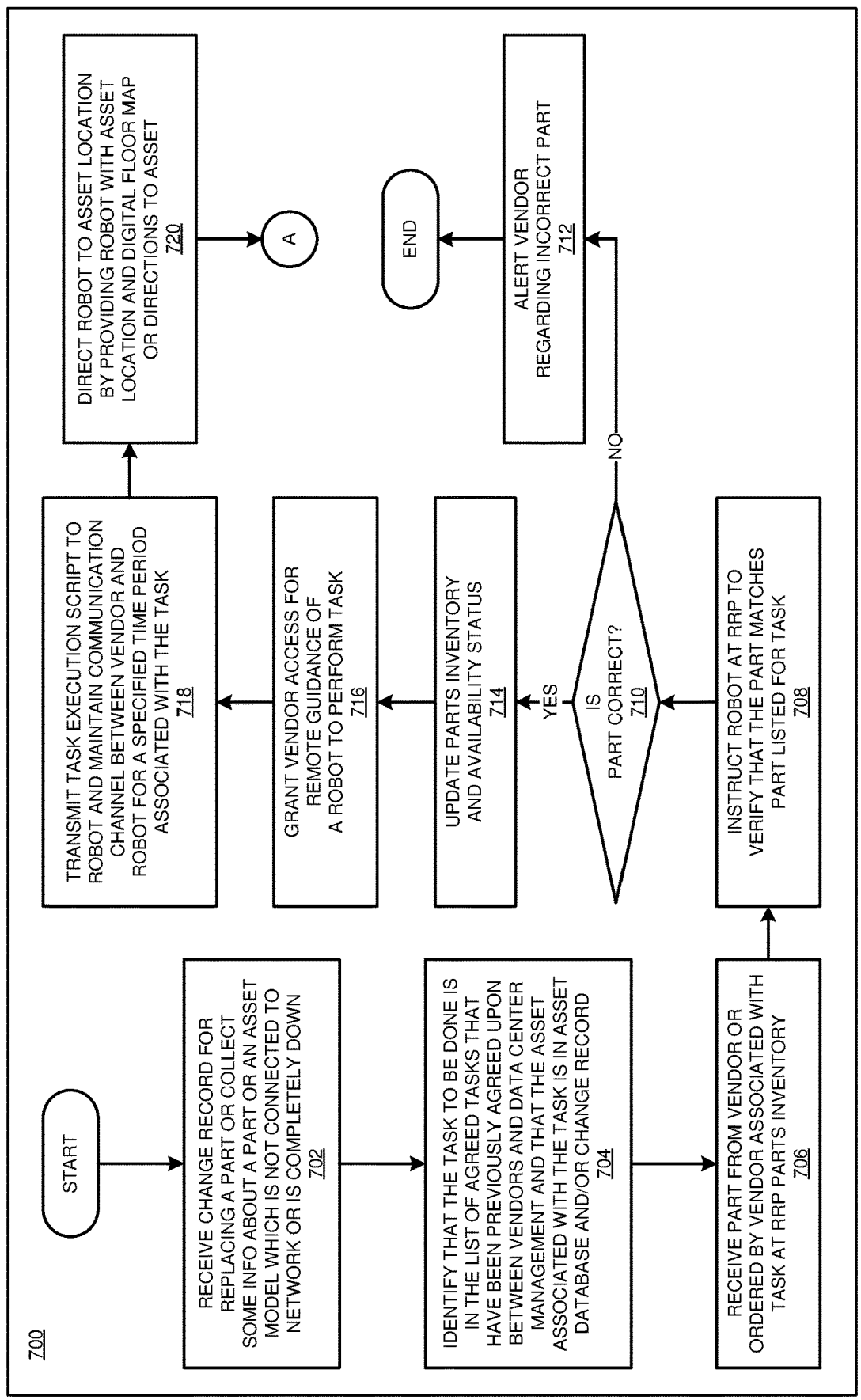
FIG. 7A depicts a first portion of a flowchart of an example robot control process in accordance with an illustrative embodiment.
Figure 7B:
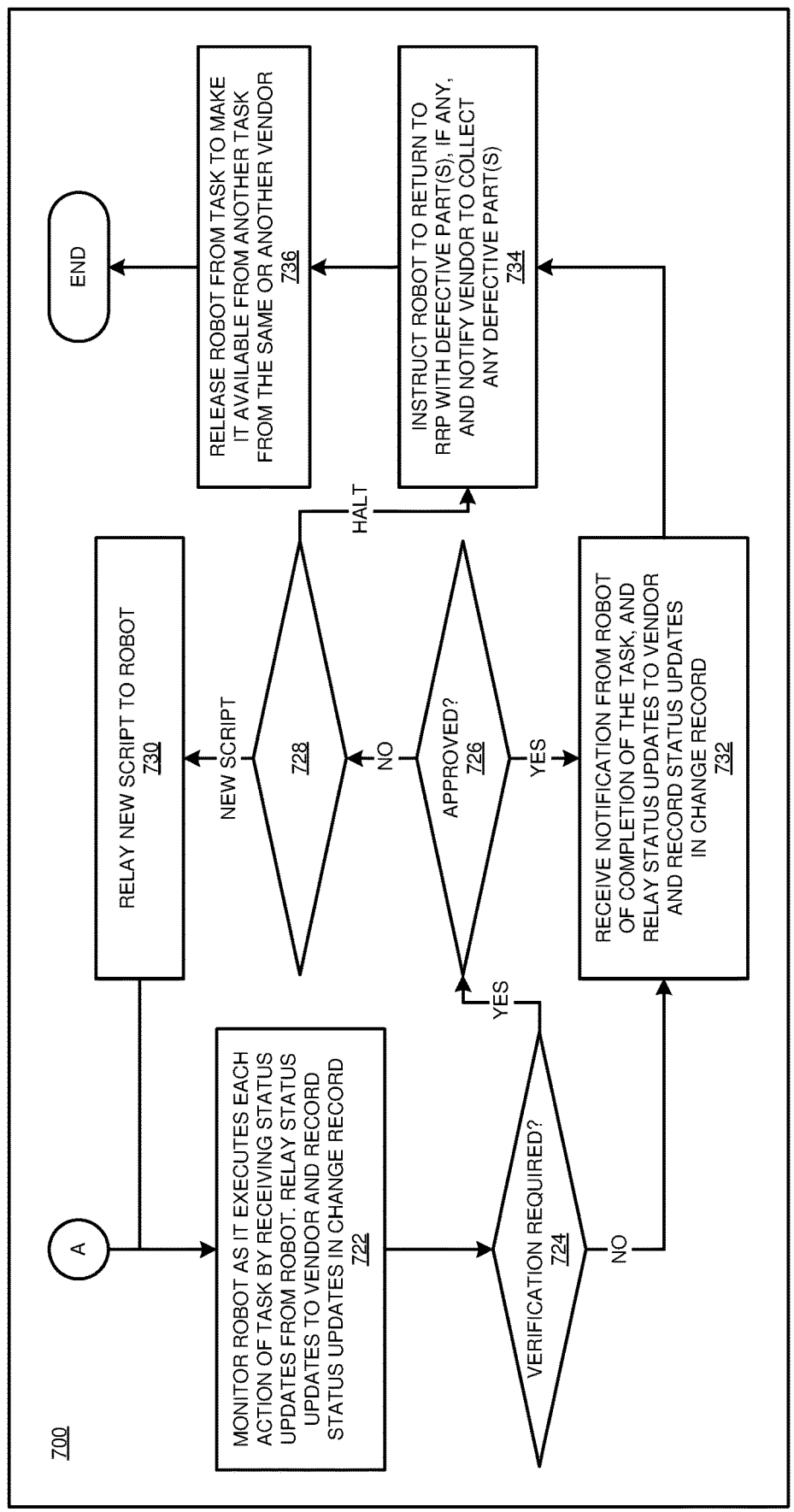
FIG. 7B depicts a second portion of a flowchart of an example robot control process in accordance with an illustrative embodiment.

With reference to FIGS. 7A-7B, these figures together depict a flowchart of an example robot control process 700 in accordance with an illustrative embodiment. In a particular embodiment, the RCP 306 carries out the process 700.

In an embodiment, at block 702, the process receives a change record for replacing a part or collect some info about a part or an asset model which is not connected to network or is completely down. In some embodiments, a corresponding case log entry is created/updated with the vendor as well. Next, at block 704, the process identifies that the task to be done is in the list of agreed tasks that have been previously agreed upon between vendors and data center management and that the asset associated with the task is in asset database and/or change record. In some embodiments, the process also verifies that the task can be performed by one of the data center robots.

Next, at block 706, the process receives, at the RRP parts inventory, one or more parts from the vendor (or ordered by the vendor) associated with the task. Next, at block 708, the process instructs the robot at the RRP to verify that the received part(s) matches the part(s) listed for the task. For example, in some embodiments, after the part arrives, the RCP instructs a robot to verify (e.g., by scanning a bar code, QR code, RFID tag, etc.) that the part is the correct part with the help of scripts that are based on vendor instructions uploaded to the RCP and/or change records stored in the RCP. Next, at block 710, the process proceeds to block 712 if the part is not the correct part, where the process alerts the vendor regarding the incorrect part. Otherwise, the process proceeds to block 714, where the process updates parts inventory and availability status process.

Next, at block 716, the process grants the vendor access to remotely communicate and/or remotely guide a robot to perform the task. Next, at block 718, the process transmits a task execution script based on instructions received from vendor and associated with the task to the robot and maintain a communication channel between the vendor and the robot for a specified time period associated with the task. Next, at block 720, the RCP issues a dispatch command to the robot for directing the robot to travel to the asset location, for example by providing robot with the asset location and a digital floor map, or by providing turn-by-turn directions to the asset.

Next, at block 722, the process monitors the robot as it executes each action of task by receiving status updates from the robot. The process also relays status updates to the vendor and records status updates in a change record associated with the asset. As indicated at block 724, in some embodiments the status update issued by the robot includes a verification request that requests approval from the vendor before proceeding to the next step. For example, in some such embodiments the script instructs the robot to issue a status update with a verification request at one or more points while performing the task.

In some embodiments, the verification request includes information such as images or test results, for the vendor to review to make a determination about whether completed steps of the task have had the expected results or indicate a problem. In some embodiments, the vendor can remotely view the progress, for example using augmented reality or viewing a video stream of the task being performed by the robot.

As indicated at block 726, if the results of the steps have thus far been acceptable, the vendor can issue an instruction to the robot indicating an approval of the results and a command to continue to block 732 to complete the task. Note that in some embodiments, the verification block 724 occurs a plurality of times depending on the number of verification requests that are included in the script for a particular task.

At block 726, if the vendor detects a problem, the vendor can issue an instruction to the robot indicating non-approval of the results and, as indicated at block 728, the vendor can issue a command to halt the task, in which case the task ends and the process skips ahead to block 734. Alternatively, at block 728, the vendor can opt to provide updated instructions for correcting the problem, in which case the process continues to block 730 where the RCP receives the instructions from the vendor and relays a corresponding script or command(s) to the robot. The robot receives the new command(s) or script, which dynamically modifies the task with updated script to correct the problem. The process then reverts to block 722, where the process monitors the robot as it executes the updated task.

If there are no verification requests, or if all verification requests have been addressed by the vendor with approvals, the process continues to block 732. At block 732, the process receives notification from the robot upon completion of the task, relays the completion status to the vendor, and records the completion status in the change record. In some embodiments, the process reverts to block 724 if the script includes a verification request upon completion of the task. Otherwise, the process continues to block 734.

At block 734, with the task completed or halted, the RCP issues a recall command to the robot for instructing the robot to return to the RRP along with any defective part(s) and any other packaging or other foreign objects that may be present, and the RCP notifies the vendor regarding any parts that were replaced or unused. In some embodiments, the process includes instructing the vendor to collect the replaced part, arrange for shipping of the replaced part, ships the replaced part to the vendor, stores the replaced part for the vendor, disposes or destroys the replaced part, or provides one or more of these or other options to the vendor for determining the disposition of the replaced part.

Finally, at block 736, the process releases the robot from the task, including disconnecting the vendor from the robot, thereby making the robot available for another task from the same or another vendor. In some embodiments, the process notifies the RRP regarding the release and return of the robot, which triggers an inspection or maintenance routine by the RRP to determine whether the robot is in good operating condition before assigning another task to the robot. For example, in some embodiments, the RRP recharges the battery and/or initiates a built-in self test (BIST) on the robot to check the operability of the robot. In some such embodiments, once the RRP determines that the robot is in good operating condition, the RRP notifies the RCP that a robot is available for performing a task.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (erasable programmable read-only memory (EPROM) or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
identifying a robot that is available to perform a task which comprises installing an asset in a data center;
transmitting a script based on instructions received from a vendor associated with the task to the robot, wherein the script includes commands corresponding to actions to be executed by the robot in performing the task;
controlling the robot in performing the task by the vendor from a remote location using augmented reality (AR) technology by allowing the vendor to remotely guide the robot to perform the task by establishing and maintaining a network connection between the vendor and the robot and relaying augmented-reality data packets between the vendor and the robot, viewing a progress of the task, issuing instructions indicating either approval or non-approval of each stop of the task, and updating task-related records in real-time;
transmitting a dispatch command to the robot that causes the robot to travel from a robot resting place to the asset to begin the task;
verifying that the asset is a correct asset by scanning a QR code of the asset and comparing the scanned QR code to asset information included in the script;
checking a status of the asset to ensure that the asset is in a power-off state;
updating asset inventory in response to a verification that the asset is the correct asset;
sending an availability status in response to the asset being in the power-off state;
monitoring the robot to confirm that the actions to be executed by the robot in performing the task complies with security policies of the data center which includes confirming that the task is being performed in compliance with a change record associated with the task and data center policies;
relaying a verification request received from the robot after the robot has completed a portion of the task to the vendor;
relaying, responsive to the verification request, an updated script based on updated instructions from the vendor for dynamically modifying the task to correct an irregularity by replacing at least one defective part;
transmitting, responsive to an indication from the robot of completion of the task, a recall command to the robot configured to enable the robot to travel from the asset to the robot resting place with the at least one defective part that was replaced;
sending a notification of the at least one defective part that was replaced and a plurality of options for disposing the at least one defective part to the vendor;
releasing the robot from the task which includes disconnecting the vendor from the robot;
initiating a built in test (BIST) on the robot to check an operability of the robot in response to the vendor being disconnected from the robot; and
sending a notification that the robot is available for performing another task in response to the robot being in good operating condition.

2. The computer implemented method of claim 1, wherein the verification request corresponds with a command in the script for the robot to issue the verification request with a status update, and wherein the verification request includes information regarding the portion of the task and requests approval from the vendor, and the plurality of options include a first option of storing the at least one defective part, a second option of shipping the at least one defective part, and a third option of destroying the at least one defective part.

3. The computer implemented method of claim 1, further comprising verifying the script by comparing a calculated checksum of the script to a checksum provided by the vendor, wherein each of a plurality of different vendors has exclusive use of the robot during respective time windows, wherein the vendor is one of the plurality of vendors.

4. The computer implemented method of claim 3, further comprising identifying, responsive to the robot returning to the robot resting place, the robot as being available to perform another task associated with another vendor of the plurality of vendors and involving another asset in the data center.

5. The computer implemented method of claim 1, further comprising assigning a time window to the vendor that defines an amount of time that the vendor has for the robot to complete the task.

6. The computer implemented method of claim 1, further comprising reviewing the task for compliance with data center rules.

7. The computer implemented method of claim 1, further comprising using the robot to perform a post-task activity comprising identifying a condition of a part removed by the robot while performing the task.

8. The computer implemented method of claim 1, further comprising maintaining a map of the data center that includes locations of assets and the robot resting place.

9. The computer implemented method of claim 8, further comprising transmitting the map and turn-by-turn directions to the robot with the dispatch command to enable the robot to locate the asset.

10. The computer implemented method of claim 1, further comprising using the robot to perform a pre-task activity comprising confirming receipt of a part associated with the task and notifying the vendor regarding receipt of the part.

11. The computer implemented method of claim 1, further comprising:
recharging a battery of the robot in response to the vendor being disconnected from the robot; and
sending a notification that the robot has traveled from the asset to the robot resting place and that the vendor has been disconnected from the robot in response to the robot traveling from the asset to the robot resting place and the vendor being disconnected from the robot.

12. The computer implemented method of claim 1, further comprising confirming that the task is included in a list of previously agreed-upon tasks in a stored profile associated with the vendor.

13. The computer implemented method of claim 1, further comprising confirming an identity of the vendor and authorization of the vendor to receive data associated with the task while the robot performs the task.

14. A computer usable program product for controlling a robot to perform a task, the computer program product comprising one or more computer readable storage media, and program instructions collectively stored on the one or more computer readable storage media, the program instructions executable by a processor to cause the processor to perform operations comprising:
identifying the robot as being available to perform the task which comprises installing an asset in a data center;
transmitting a script based on instructions received from a vendor associated with the task to the robot, wherein the script includes commands corresponding to actions to be executed by the robot in performing the task;
controlling the robot in performing the task by the vendor from a remote location using augmented reality (AR) technology by allowing the vendor to remotely guide the robot to perform the task by establishing and maintaining a network connection between the vendor and the robot and relaying augmented-reality data packets between the vendor and the robot, viewing a progress of the task, issuing instructions indicating either approval or non-approval of each stop of the task, and updating task-related records in real-time;
transmitting a dispatch command and turn-by-turn directions to the robot that causes the robot to travel from a robot resting place to the asset to begin the task;
verifying that the asset is a correct asset by scanning a QR code of the asset and comparing the scanned QR code to asset information included in the script;
checking a status of the asset to ensure that the asset is in a power-off state;
updating asset inventory in response to a verification that the asset is the correct asset;
sending an availability status in response to the asset being in the power-off state;
monitoring the robot to confirm that the actions to be executed by the robot in performing the task complies with security policies of the data center which includes confirming that the task is being performed in compliance with a change record associated with the task and data center policies;
relaying a verification request received from the robot after the robot has completed a portion of the task to the vendor;
relaying, responsive to the verification request, an updated script based on updated instructions from the vendor for dynamically modifying the task to correct an irregularity by replacing at least one defective part;
transmitting, responsive to an indication from the robot of completion of the task, a recall command to the robot configured to enable the robot to travel from the asset to the robot resting place with the at least one defective part that was replaced;
sending a notification of the at least one defective part that was replaced and a plurality of options for disposing the at least one defective part to the vendor;
releasing the robot from the task which includes disconnecting the vendor from the robot;
initiating a built in test (BIST) on the robot to check an operability of the robot in response to the vendor being disconnected from the robot; and
sending a notification that the robot is available for performing another task in response to the robot being in good operating condition.

15. The computer usable program product of claim 14, wherein the stored program instructions are stored in a computer readable storage device in a data processing system, and wherein the stored program instructions are transferred over a network from a second data processing system, and the plurality of options include a first option of storing the at least one defective part, a second option of shipping the at least one defective part, and a third option of destroying the at least one defective part.

16. The computer usable program product of claim 14, wherein the stored program instructions are stored in a computer readable storage device in a server data processing system, and wherein the stored program instructions are downloaded over a network to a remote data processing system for use in a computer readable storage device associated with the remote data processing system, further comprising:
program instructions to meter use of the computer usable code associated with the request; and
program instructions to generate an invoice based on the metered use.

17. A computer usable program product of claim 14, further comprising program instructions to verify the script by comparing a calculated checksum of the script to a checksum provided by the vendor, wherein the verification request corresponds with a command in the script for the robot to issue the verification request with a status update, and wherein the verification request includes information regarding the portion of the task and requests approval from the vendor.

18. A computer usable program product of claim 14, wherein each of a plurality of different vendors has exclusive use of the robot during respective time windows, wherein the vendor is one of the plurality of vendors.

19. A computer system comprising a processor and one or more computer readable storage media, and program instructions collectively stored on the one or more computer readable storage media, the program instructions executable by the processor to cause the processor to perform operations comprising:
- identifying a robot that is available to perform a task which comprises installing an asset in a data center;
- transmitting a script based on instructions received from a vendor associated with the task to the robot, wherein the script includes commands corresponding to actions to be executed by the robot in performing the task;
- controlling the robot in performing the task by the vendor from a remote location using augmented reality (AR) technology by allowing the vendor to remotely guide the robot to perform the task by establishing and maintaining a network connection between the vendor and the robot and relaying augmented-reality data packets between the vendor and the robot, viewing a progress of the task, issuing instructions indicating either approval or non-approval of each stop of the task, and updating task-related records in real-time;
- transmitting a dispatch command to the robot that causes the robot to travel from a robot resting place to the asset to begin the task;
- verifying that the asset is a correct asset by scanning a QR code of the asset and comparing the scanned QR code to asset information included in the script;
- checking a status of the asset to ensure that the asset is in a power-off state;
- updating asset inventory in response to a verification that the asset is the correct asset;
- sending an availability status in response to the asset being in the power-off state;
- monitoring the robot to confirm that the actions to be executed by the robot in performing the task complies with security policies of the data center which includes confirming that the task is being performed in compliance with a change record associated with the task and data center policies;
- relaying a verification request received from the robot after the robot has completed a portion of the task to the vendor;
- relaying, responsive to the verification request, an updated script based on updated instructions from the vendor for dynamically modifying the task to correct an irregularity by replacing at least one defective part;
- transmitting, responsive to an indication from the robot of completion of the task, a recall command to the robot configured to enable the robot to travel from the asset to the robot resting place with the at least one defective part that was replaced;
- sending a notification of the at least one defective part that was replaced and a plurality of options for disposing the at least one defective part to the vendor;
- releasing the robot from the task which includes disconnecting the vendor from the robot;
- initiating a built in test (BIST) on the robot to check an operability of the robot in response to the vendor being disconnected from the robot; and
- sending a notification that the robot is available for performing another task in response to the robot being in good operating condition, wherein the verification request requests approval from the vendor.

20. The computer system of claim 19, further comprising verifying the script by comparing a calculated checksum of the script to a checksum provided by the vendor, wherein the verification request corresponds with a command in the script for the robot to issue the verification request with a status update, wherein the plurality of options include a first option of storing the at least one defective part, a second option of shipping the at least one defective part, and a third option of destroying the at least one defective part, and wherein the verification request includes information regarding the portion of the task and the status update is recorded in the change record associated with the asset.

* * * * *